March 3, 1970 L. E. JOHNSON 3,498,562
LINE CONTROL FOR SPIN CASTING REELS
Filed Nov. 13, 1967
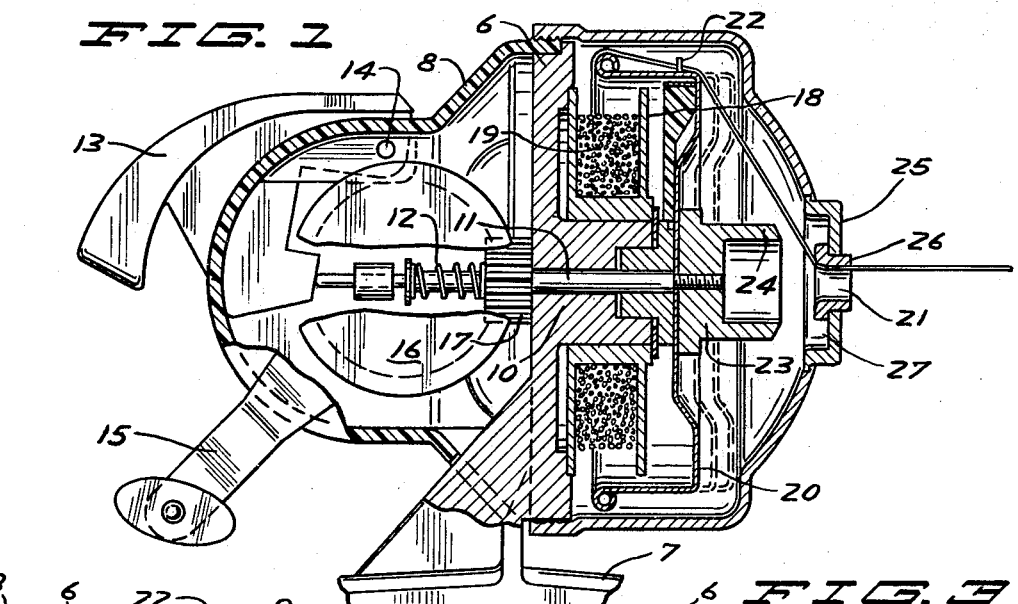
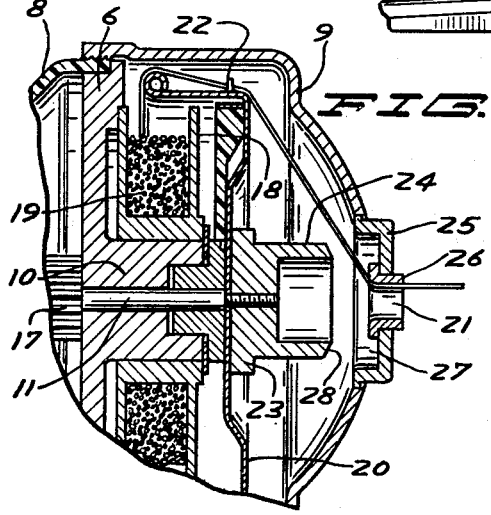
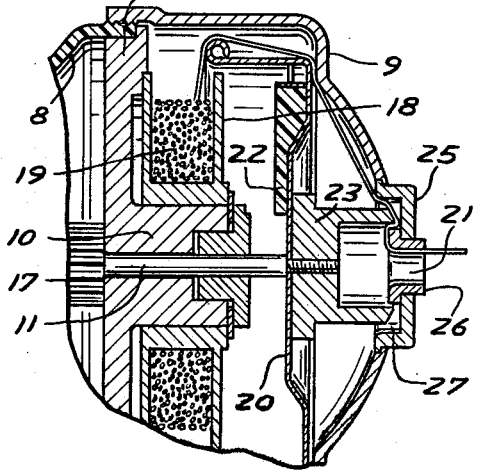
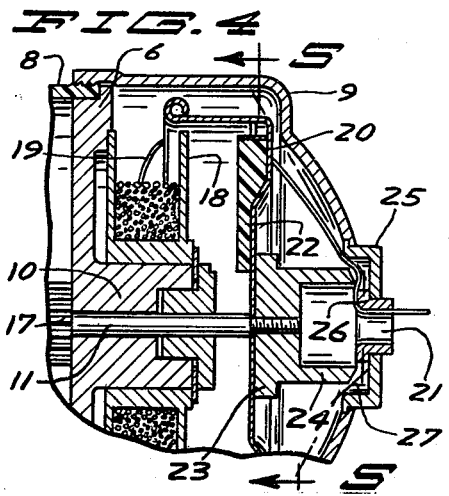
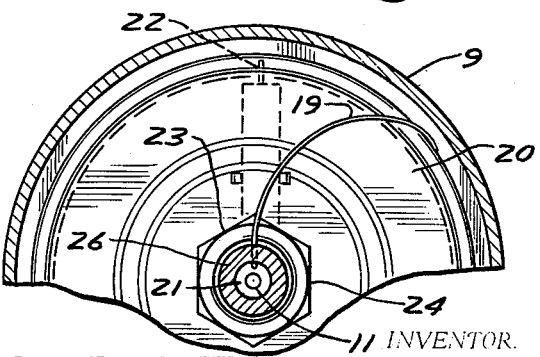
INVENTOR.
LLOYD E. JOHNSON
BY
ATTORNEYS

United States Patent Office 3,498,562
Patented Mar. 3, 1970

3,498,562
LINE CONTROL FOR SPIN CASTING REELS
Lloyd E. Johnson, Mankato, Minn., assignor to Denison-Johnson, Inc., Mankato, Minn., a corporation of Minnesota
Filed Nov. 13, 1967, Ser. No. 682,208
Int. Cl. A01k *89/00*
U.S. Cl. 242—84.2                                         4 Claims

ABSTRACT OF THE DISCLOSURE

A spin casting reel in which a pick-up rotor is mounted for axial movement from a line retrieving position adjacent the line spool to a line snubbing position adjacent a front cover plate, and in which the line is free to be extracted from the reel and out through an opening in the cover plate when the rotor is disposed between said two positions, together with means for controlling the movement of the line during the time it is so being extracted from the reel during normal casting action. Such line control means consists of a first annular member carried by the cover plate immediately adjacent to the line opening therein, and a second annular member extending forwardly from the pick-up rotor to telescopically and progressively overlap the first annular member and thereby create sharp reverse bends or curves in the line for the purpose of applying controlled resistance to the line movement. The second annular member also serves to detachably secure the pick-up rotor to an operating shaft extending therethrough.

Background of the invention

In recent years fishing with so-called closed face spin casting reels, in which the line is peeled off a normally non-rotatable spool during the casting operation, has become very popular in view of the many advantages that this type of reel has over other types. To the best of my knowledge all of such reels currently being marketed have an exposed thumb lever which, when depressed by the operator at the start of a casting stroke, will actuate a snubber to prevent escape of the line until the desired forward motion of the rod has given the lure required direction and impetus, at which time the thumb lever is released so that the line can freely strip off of the spool in response to the pull of the lure. To retrieve the line, the operator then turns a crank to activate a pick-up device, mounted adjacent to the spool, and which is operative to engage the line and by rotary motion wind it back on the spool.

Although numerous reel mechanisms have been designed to perform these functions little progress has been made in providing means for controlling the flight of the lure between the time when the line is released and the time when the lure strikes the water, or until pressure is again applied to the thumb lever to positively snub the line. In either case, and even with an experienced operator, it is virtually impossible to accurately control the length of the cast, and if snubbing is applied too suddenly the lure may be jerked back far short of the distance it would otherwise have reached. It is to overcome these deficiencies that the present invention is directed and has been perfected.

Drawing and description

In the drawing, which illustrates a perferred embodiment of the invention:

FIG. 1 is a longitudinal sectional elevation of a spin casting reel incorporating my improved line control feature.

FIG. 2 is a detail sectional view showing the relationship of the line control parts when the pick-up rotor is in line retrieving position.

FIG. 3 is a sectional view similar to FIG. 2 but showing the rotor advanced to its foremost position where it peripherally engages the cover plate to releasably clamp or snub the line against any outward movement.

FIG. 4 corresponds to FIGS. 1 and 2, but in this instance the parts are in an intermediate position so as to create a variable degree of frictional resistance to the line movement as may be desired and under full control of the operator.

FIG. 5 is a detail sectional elevation on the line 5—5 in FIG. 4 showing the contour of the line as it comes over the peripheral edge of the rotor from the spool and curves in to the line outlet of the cover plate.

Referring to the drawing more particularly and by reference characters, 6 designates a main frame of a reel having a tang 7 by which it is secured to a casting rod. The frame member cooperates with rear cover 8 and front cover 9 to form a hollow body containing the reel mechanism. Such mechanism essentially includes a bearing 10 of frame 6 in which is slidably and rotatably mounted a shaft 11 that is yieldingly held in a rearward position by a spring 12 but may be moved forwardly by an exposed thumb lever 13 pivoted at 14 to the rear cover 8. The shaft 11 is rotated by a crank handle 15 on another shaft journaled in frame 6 and at its inner end carrying a gear 16 meshing with pinion 17 also journaled in the frame and slidably keyed to the shaft 11, so that turning of the handle 15 will rotate shaft 11 regardless of the latter's axial position.

A line spool 18 is mounted on bearing 10 within the front cover 9 and is normally non-rotatable so that the line 19 may be peeled from it during the casting operation, the line passing over the rim of a pick-up rotor or spooling member 20, and thence outwardly through a center opening 21 in the cover 9. The pick-up rotor shown is of the type having a cam actuated pick-up pin 22 for engaging the line to retrieve it and wind it back on the spool 18, but which is retracted during casting so as to not interfere with the free flow of the line at that time.

The various parts are so proportioned that when the thumb lever 13 is depressed to move the shaft 11 and rotor 20 to their foremost positions the forward and outer face of the rotor will peripherally press against an inner surface area of the cover plate 9, as shown in FIG. 3, to clamp or snub the line against further travel movement out of the opening 21.

The mechanism as thus far described is well known in the art, a more detailed form being illustrated, for instance, in my Patent No. 3,154,264 which issued Oct. 27, 1964.

The elements which have now been incorporated in the reel to create a positive and effective line control during the casting movement of the rod and reel, include a cup-shaped nut 23 which is threaded to screw onto the forward end of shaft 11, to firmly but detachably secure the rotor 20 thereto, and a cylindrical flange 24 extending forwardly toward front cover 9.

The cover 9, instead of having a simple eyelet opening for the line (as in 3,154,264), is provided with a second cup-like element 25 having an inner sleeve 26 which defines the line opening 21 and also serves to form an annular channel 27 for the reception of the forward end portion of sleeve 24.

The parts are so proportioned and arranged that when the rotor 20 is in its rearmost position, for line retrieving, or is only slightly advanced, for unimpeded casting, then the flange 24 will not touch or interfere with the line as it passes from the periphery of the rotor 20 to the sleeve 26. To further ensure this clearance, and yet give the flange 24 as much length as possible, the forward end surface of the flange is conically slanted, as at 28, so as to be parallel with the line at this point (per FIG. 2).

To effect the desired flight control of the lure, after the line is initially released, the operator, by thumb pressure on the lever 13, moves the rotor 20 forwardly so that the line will be engaged by the flange 24 and be progressively moved into channel 27. There is no physical contact between the flange 24 and the parts 25 and 26 and consequently no clamping of the line in this area as there is no desire to snub the line until the rotor and front cover coact at their outer peripheries.

In short, there is always sufficient space around the flange to provide clearance for movement of a line of maximum strength for the reel. As will be seen, however, the line comes into contact with the parts 24 and 26 to receive frictional resistance to line movement therebetween, and this resistance is amplified by the sharply reverse bends or curves that are thus created. And, as illustrated in FIGS. 3 and 4, the total resistance to line travel is under desired variable control by the operator until the lure flight is terminated.

Another important aspect of the present invention is the fact that by designing the reel in the manner shown the controlled friction is applied to the line at a point very close to the axis of opening 21, rather than at a point radially outwardly therefrom. This is true because during the period when control of the lure flight is needed the condition of the line between the spool 18 and outlet opening 21 is somewhat different than at other times. Thus, when the line is being retrieved, as in FIG. 2, and when it is being snubbed, as in FIG. 3, the stretch of line from the opening 21 to the periphery of the rotor 20 is at all times taut and lies in a plane passing through the axis of shaft 11.

During the casting operation, however, the line is spun off of the spool so fast that the portion of it passing over the rotor edge and toward the opennig 21 is deflected, by air resistance and centrifugal force, into a curved path, such as indicated in FIG. 5. And since this portion is comparatively slack it is advantageous to apply the frictional resistance at the point where the line is about to be discharged from the opening to produce the most effective control.

It is understood that modifications may be made in the reel construction an above set forth, providing such modifications come within the spirit and scope of the appended claims.

Having now illustrated and described a preferred embodiment of the invention, what I claim to be new and desire to protect by Letters Patent is:

1. For a fishing reel in which a body member has a forwardly disposed cover with a line opening, a line spool mounted in the body member on a fore-and-aft axis, a shaft extending through the spool and mounted in the frame for rotary and axial movement, a circular line pick-up member carried on the forward end of the shaft, manually controlled means for moving the shaft and pick-up member between fore-and-aft axial positions with the line passing from the spool over the periphery of the pick-up member and thence to and out through said opening, means for rotating the shaft when the pick-up member is in one of said two positions to engage the line and wind it on the spool as it is being retrieved rearwardly through said opening, the line being free of winding engagement with the pick-up member when the latter is moved axially away from such position, and means for snubbing the line to stop its forward movement when the pick-up member reaches the other of said positions, means for controlling the forward movement of the line from the reel during the time that the pick-up member is being moved from the first to the second of the aforesaid two positions, comprising a pair of cooperating circular elements carried, one by the cover and one by the pick-up member, and which are axially spaced to allow unobstructed passage of the line when the pick-up member is initially moved from its first of said two positions, but which elements have telescopically overlapping surfaces for frictionally engaging the line and forming reverse bends therein to thereby create progressively increasing resistance to movement of the line outwardly from the cover opening as the pick-up member approaches the other of said two positions, the cover having a rearwardly opening recess formed in part by its aforesaid circular element, and the circular element of the pick-up member being a forwardly directed cylindrical flange the forward edge of which is adapted to project into said recess to effect such telescoping overlapping of surfaces.

2. The structure specified in claim 1, wherein said overlapping friction surfaces are concentric with the pick-up member but are located radially closer to the axis thereof than to its periphery.

3. In a spin casting reel, a housing having a forward cover with a line opening therein, a cup element secured in said opening and presenting a rearwardly facing recess, a line spool in the housing, and a manually controlled line pick-up member mounted in the housing for rotary and axial adjustment, said pick-up member having a forward surface adapted to snub the line between itself and the cover plate when the pick-up member is in its foremost position, a sleeve element extending forwardly from the pick-up member for engaging the line and bending it into said recess so as to apply controlled frictional resistance thereto before the pick-up member reaches its maximum forward limit of axial movement.

4. The structure specified in claim 3 in which the sleeve element has a forward end surface that is conically slanted to engage the line at an angle coincident therewith.

References Cited

UNITED STATES PATENTS

| | | | |
|---|---|---|---|
| 3,097,813 | 7/1963 | Golec | 242—84.2 |
| 3,128,059 | 4/1964 | Holahan | 242—84.2 |
| 3,160,363 | 12/1964 | Holahan | 242—84.2 |
| 3,223,346 | 12/1965 | Fowler | 242—84.2 |

FOREIGN PATENTS

| | | |
|---|---|---|
| 168,921 | 10/1959 | Sweden |

BILLY S. TAYLOR, Primary Examiner